US006353590B1

(12) United States Patent
Knudsen et al.

(10) Patent No.: US 6,353,590 B1
(45) Date of Patent: Mar. 5, 2002

(54) MEDIA STABILIZATION FOR LASER SERVOWRITING

(75) Inventors: James K. Knudsen, Woodbury; Arne B. Boberg, Shoreview; Robert S. Jackson, Little Canada; Leslie M. Milner, Circle Pines; Brian K. Parliament, Woodbury; Daniel P. Stubbs, Marine on St. Croix; Mark P. Lubratt, White Bear Lake, all of MN (US); Israel Tzur, Longmont; David M. Perry, Lafayette, both of CO (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/431,746

(22) Filed: Nov. 1, 1999

Related U.S. Application Data

(63) Continuation of application No. 08/868,302, filed on Jun. 3, 1997, now abandoned, which is a continuation-in-part of application No. 08/662,144, filed on Jun. 12, 1996, now abandoned.

(51) Int. Cl.$^7$ ........................... G11B 15/60; G11B 7/00; B23K 26/14
(52) U.S. Cl. ................... 369/263; 369/115; 219/121.68
(58) Field of Search ............................... 369/115, 258, 369/261, 263, 270, 271, 44.11; 360/98.08, 99.05, 99.12, 224; 219/121.6, 121.68, 121.69, 121.82

(56) References Cited

U.S. PATENT DOCUMENTS

| 3,178,719 A | 4/1965 | Shapiro |
| 3,179,945 A | 4/1965 | Shapiro |
| 3,327,916 A | 6/1967 | Wiedenhammer et al. |
| 3,927,252 A | 12/1975 | Polley |
| 4,071,854 A | 1/1978 | Bijon et al. |
| 4,074,330 A | * 2/1978 | Norton et al. ............... 360/102 |
| 4,158,867 A | 6/1979 | Tops et al. |
| 4,159,494 A | 6/1979 | Evans et al. |
| 4,334,302 A | 6/1982 | Peppers |
| 4,376,960 A | 3/1983 | Karol |
| 4,419,704 A | * 12/1983 | Radman et al. ............. 360/102 |
| 4,769,733 A | 9/1988 | Freeman et al. |
| 4,833,556 A | 5/1989 | Kosarko et al. |

(List continued on next page.)

FOREIGN PATENT DOCUMENTS

| EP | 0 457 459 | 11/1991 |
| JP | 60-22768 | 2/1985 |
| JP | 63-9059 | 1/1988 |

OTHER PUBLICATIONS

D. H. McMurtry, "Double Bernoulli Disk Configuration," *IBM Technical Disclosure Brochure*, 19, 3573–3574 (Feb. 1977).
J. R. Cope et al., "Bernoulli Disk Decoupler and Stabilizer," *IBM Technical Disclosure Brochure*, 20, 916–917 (Aug. 1977).
H. G. Seifert, "Foil Splitter for Flexible Disk Pack," *IBM Technical Disclosure Brochure*, 20, 2266 (Nov. 1977).
A. Bowen, "Flexible Magnetic Disk Stack," *IBM Technical Disclosure Brochure*, 21, 2957–2958 (Dec. 1978).

*Primary Examiner*—William Klimowicz
(74) *Attorney, Agent, or Firm*—Eric D. Levinson

(57) ABSTRACT

The present invention provides methods and apparatus for stabilizing data storage media during laser servowriting of optical servo tracks on the media. The apparatus includes a spindle for rotating the media during servowriting, a fixed media platform, and a media support for stabilizing the vertical position of the media during servowriting. The media support may include channels to reduce or control the formation of an air bearing in the area of servowriting to stabilize the vertical positioning of the media. The media support may also include a vacuum slot for drawing a vacuum through the channels.

20 Claims, 9 Drawing Sheets

U.S. PATENT DOCUMENTS

| | | |
|---|---|---|
| 4,961,123 A | 10/1990 | Williams et al. |
| 4,998,175 A | 3/1991 | Yoshimori et al. |
| 5,005,098 A | 4/1991 | Kanada |
| 5,077,726 A | 12/1991 | Dodds et al. |
| 5,091,812 A | 2/1992 | Kanada |
| 5,279,775 A | 1/1994 | Thomas et al. |
| 5,283,773 A | 2/1994 | Thomas et al. |
| 5,293,287 A | 3/1994 | Tzur et al. |
| 5,322,987 A | 6/1994 | Thomas et al. |
| 5,334,849 A | 8/1994 | Thomas et al. |
| 5,359,590 A | 10/1994 | Ogura et al. |
| 5,362,941 A | 11/1994 | Johnson et al. |
| 5,459,708 A | 10/1995 | Sundaram et al. |
| 5,717,551 A | 2/1998 | Negishi et al |

\* cited by examiner .

MEDIA STABILIZATION FOR LASER SERVOWRITING

RELATED APPLICATIONS

This application is a continuation of U.S. patent application Ser. No. 08/868,302 filed on Jun. 3, 1997, now abandoned, which is a continuation-in-part of U.S. patent application Ser. No. 08/662,144, filed on Jun. 12, 1996 now abandoned.

FIELD OF THE INVENTION

The present invention relates to the field of laser servowriting of optical servo tracks on data storage media. More particularly, the present invention relates to apparatus and methods of stabilizing flexible media during laser servowriting of optical servo tracks on the media.

BACKGROUND OF THE INVENTION

Laser servowriting of data storage media involves processing the surface of the media to provide discontinuities, such as grooves or pits, in the surface that can be used as a reference to allow for optical positioning of the read/write mechanisms used to store and/or retrieve information on the media. The process typically involves ablating material or otherwise modifying the surface of the media in a manner that allows for precise control over the position of the read/write mechanisms during use of the media. By relying on servowritten tracks as a reference to optically locate the read/write mechanisms, storage density of data on the media can be increased by providing more precise location of the read/write mechanisms. One example of a data storage product using servowritten tracks to increase storage density includes the LS-120 SuperDisk™ marketed by Imation Corp., St. Paul, Minn.

Typical laser servowriting equipment includes a rotating platter on which the media is placed to perform the servowriting operation. Those servowriting systems suffer from variations in the distance between the platter and the laser optics as the optics move radially relative to the platter during servowriting. Those variations are typically of a magnitude sufficient to place the media surface outside of the depth of focus of the laser energy, leading to differences in the depth and/or width of the servo tracks which can affect optical contrast. Those differences in servo track depth, width, and/or optical contrast can reduce the accuracy of positioning the read/write mechanisms.

As a result, improved methods and apparatus of stabilizing the vertical position of flexible media in laser servowriting systems are needed to allow for reliable production of higher density data storage products.

SUMMARY OF THE INVENTION

The present invention provides methods and apparatus for stabilizing data storage media during laser servowriting of optical servo tracks on the media. The apparatus includes a spindle for rotating the media during servowriting, a fixed media platform, and a media support for stabilizing the vertical position of the media during servowriting.

The present invention can reduce one source of error in the distance between the laser optics and the media surface in known servowriting systems, i.e., the entrapment of dust and debris between the rotating platform and media. The entrapment of dust and debris is reduced by rotating the media above a fixed media platform and provides increased control over the distance between the laser servowriting optics and the media. That control results in more precise location and formation (i.e., width and/or depth) of the optical servo tracks, and, therefore, increased data storage density on the media.

Another advantage is that by providing a laser servowriting apparatus that includes a fixed or stationary media platter, cycle time of the servowriter, i.e., the time required to process a disk, can be reduced because of the reduced mass-moment of intertia of the system. That reduction causes a corresponding decrease in the time required to accelerate the media to the desired speed with the same size motor, thereby decreasing cycle time.

In one aspect, the present invention provides an apparatus for stabilizing data storage media during laser servowriting of optical servo tracks on the media, the apparatus including a spindle for rotating the media during servowriting; a fixed media platform; and a media support for stabilizing the vertical position of the media during servowriting. The media support may include channels or channels and a vacuum slot formed therein to enhance performance of the apparatus.

In another aspect, the present invention provides an apparatus for stabilizing data storage media during laser servowriting of optical servo tracks on the media, the apparatus including a spindle for rotating the media during servowriting; a fixed media platform; a media support for stabilizing the vertical position of the media during servowriting, the media support comprising a plurality of channels aligned generally tangential to the spindle and an upper surface having a crown located above the upper surface of the media platform.

In another aspect, the present invention provides a method of stabilizing data storage media during laser servowriting of optical servo tracks on the media, the method including steps of placing the media on a spindle; stabilizing the vertical position of the media by rotating the media above a fixed media platform and a media support; and laser servowriting optical servo tracks on the media. In some methods, the media support can include channels formed therein and, in further variations, the methods can include drawing a vacuum through the channels.

These and other features and advantages of the invention are described more completely below.

DETAILED DESCRIPTION OF THE INVENTION

The present invention provides an apparatus and methods of stabilizing data storage media during laser servowriting. By using the present invention, media stabilization levels can be achieved that allow for more consistent laser servowriting of optical servo tracks.

Figure 1A:
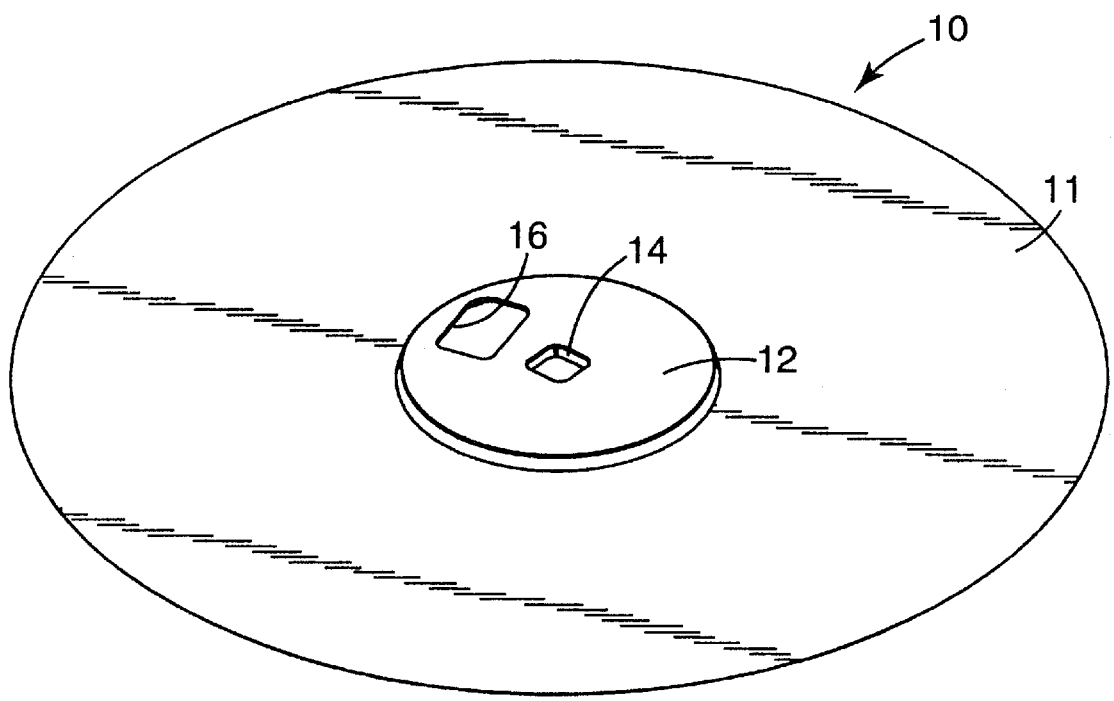
FIG. 1A is a perspective view of a disk used for data storage.
Figure 1B:
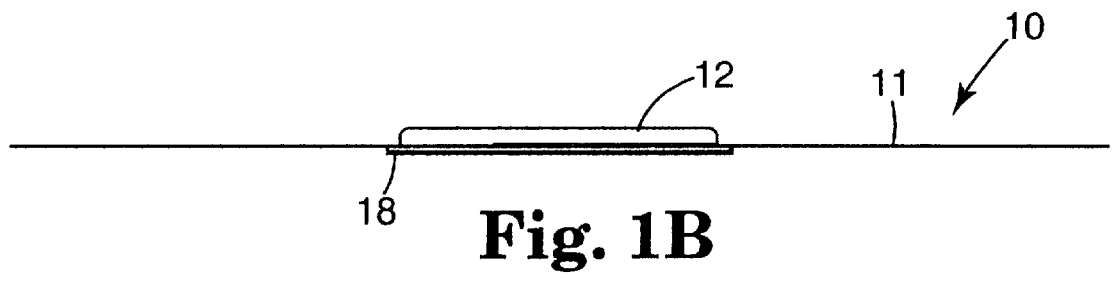
FIG. 1B is a cross-sectional view of the disk of FIG. 1A.

FIG. 1A is a perspective view of a disk 10 used for data storage and FIG. 1B is a cross-sectional view of the same. The disk 10 includes a flexible media portion 11 that is typically attached to a hub 12 by any suitable mechanism, usually adhesive. The hub 12 typically includes a centrally located opening 14 and a second opening 16, both of which are used for accurately locating the disk 10 in a read/write device or a servowriting apparatus during manufacturing. The outermost portion of the hub 12 includes a flange 18 that mates with the spindle of the laser servowriting apparatus (described more completely below). In use, disk 10 also typically includes an outer casing and other protective structure not shown in FIGS. 1A and 1B.

It will be understood that the disk depicted in FIGS. 1A and 1B is provided as an example only, and that many different disks including flexible media could be used with the methods and apparatus according to the present invention. Typically, however, the media will comprise a circular flexible substrate coated with a magnetic material on at least one surface. One substrate with which the present invention may be used is a polyethylene terephthalate film with a nominal thickness of 62 μm, where the film is bonded to a hub in any suitable manner.

Figure 2:
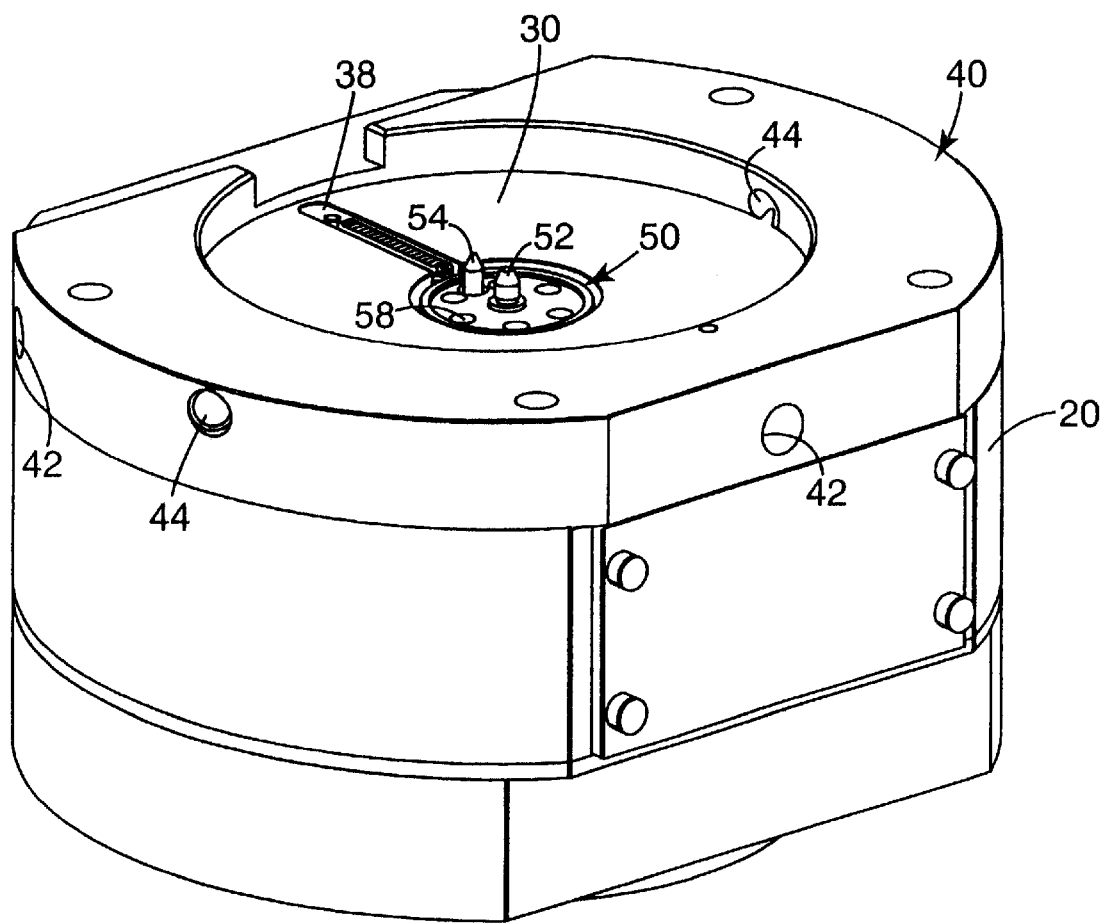
FIG. 2 is a perspective view of one apparatus useful for stabilizing flexible media during laser servowriting according to the present invention.
Figure 3:
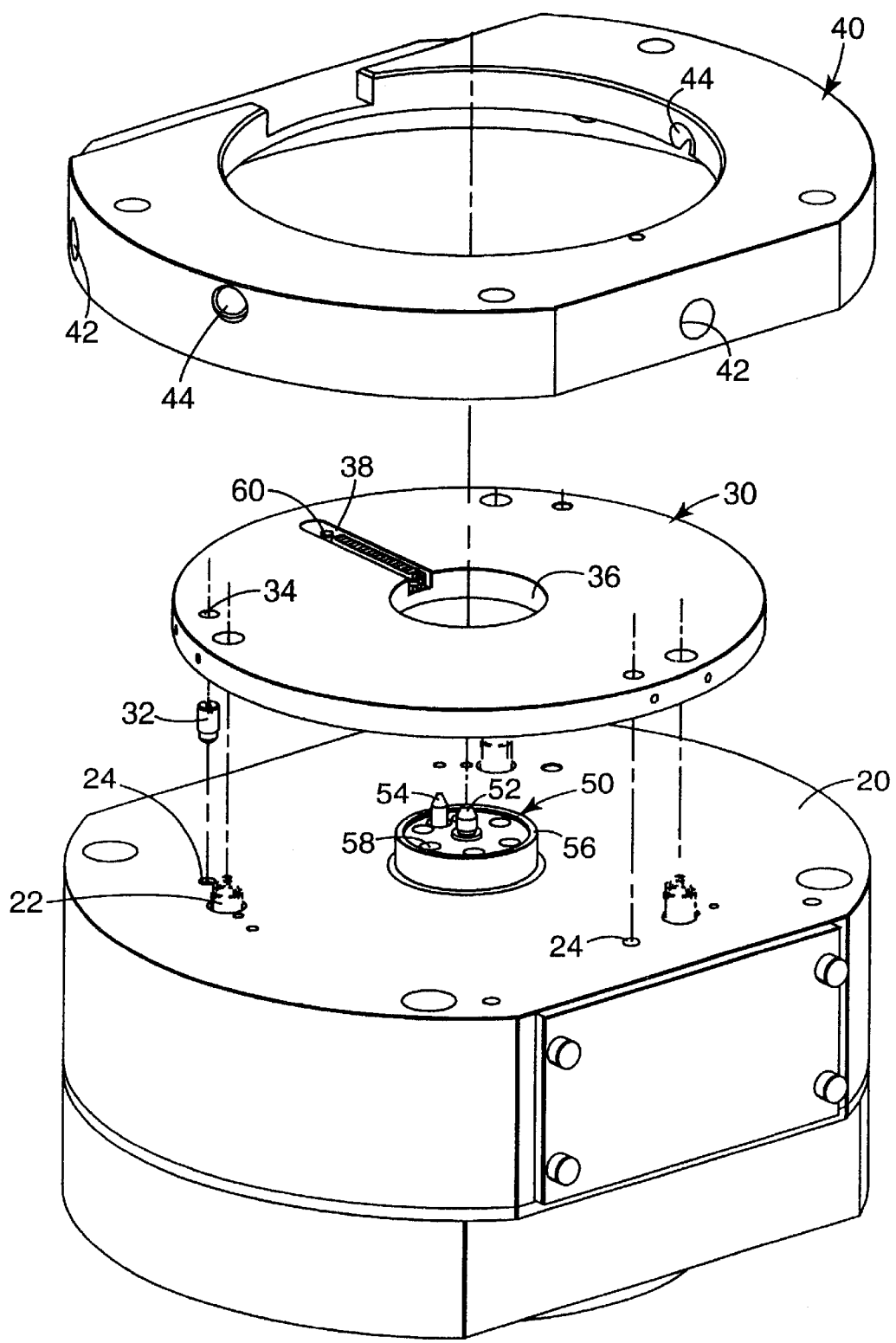
FIG. 3 is an exploded assembly view of the apparatus of FIG. 2.

FIG. 2 is a perspective view of one apparatus useful for stabilizing flexible media during laser servowriting according to the present invention and FIG. 3 is an exploded assembly view of the apparatus depicted in FIG. 2. The apparatus includes a base 20, fixed (i.e., non-rotatable) media platform 30, and shroud 40. A spindle 50 protrudes through the upper surface of base 20.

The base 20 includes tension springs 22 that attach to the bottom of the media platform 30 to retain the platform 30 in position against the base 20. The bottom ends of the springs 22 are attached to mounting shafts (not shown) provided within base 20. The top of the springs 22 are attached to the bottom of the media platform 30 such that the platform 30 is biased against the base 20. It will be understood that although a coil spring is depicted, any elastic member could be substituted to retain the platform 30 against the base 20.

A plurality of adjustment screws 32 are threaded through bores 34 in the media platform 30 and bear against the base 20 when assembled. It is preferred that each of the screws 32 include a rounded end that seats in a bore or other depression 24 in base 22 to prevent movement of the screws 32 and platform 30 as the screws 32 are turned to adjust the height of the platform 30. The springs 22 and adjustment screws 32 cooperate to allow the height of the platform 30 to be adjusted relative to the base 20 by forcing the platform 30 away from the base 20 against the force of the springs 22. As a result, the screws 32 and corresponding springs 22 provide a mechanism by which the media platform 30 can be leveled.

Leveling of the media platform 30 could be accomplished without an elastic member, e.g., by using a double nut threaded shaft in place of each spring 22 and adjustment screw 32 combination. Also, it will be understood that fixed positioning of the media platform 30 relative to the base 20 could also be provided.

The media platform 30 includes a central opening 36 through which the spindle 50 protrudes. Media platform 30 also includes a slot 38 formed in the upper surface of the media platform 30. The slot 38 is provided to receive a media support 60 (described in more detail below).

The spindle 50 is provided to mate with, for example, the hub 12 of the disk 10 and provide a means for rotating the disk 10 on the media platform 30 in synchrony with the laser servowriting process. The spindle 50 includes a centering pin 52 and locator pin 54 which fit within the openings 14 and 16, respectively, in the hub 12 of disk 10. The spindle 50 also includes a hub platform 56 adapted to support the flange 18 on hub 12 of the disk 10. Optionally, the spindle 50 can be provided with one or more magnets 58 that can be used to magnetically attract the hub 12 of a disk 10. Alternatively, portions of the spindle 50 itself could be manufactured of a magnetic material to provide a magnetic force to attract the hub 12.

The spindle 50 may be attached to a suitable means (not shown) for rotating the spindle 50. One preferred means for rotating the spindle 50 is a rotary air bearing available from Air Bearing Technology (Model ABT-SP-4.0). Other means of rotation will be known to those skilled in the art.

Figure 4:
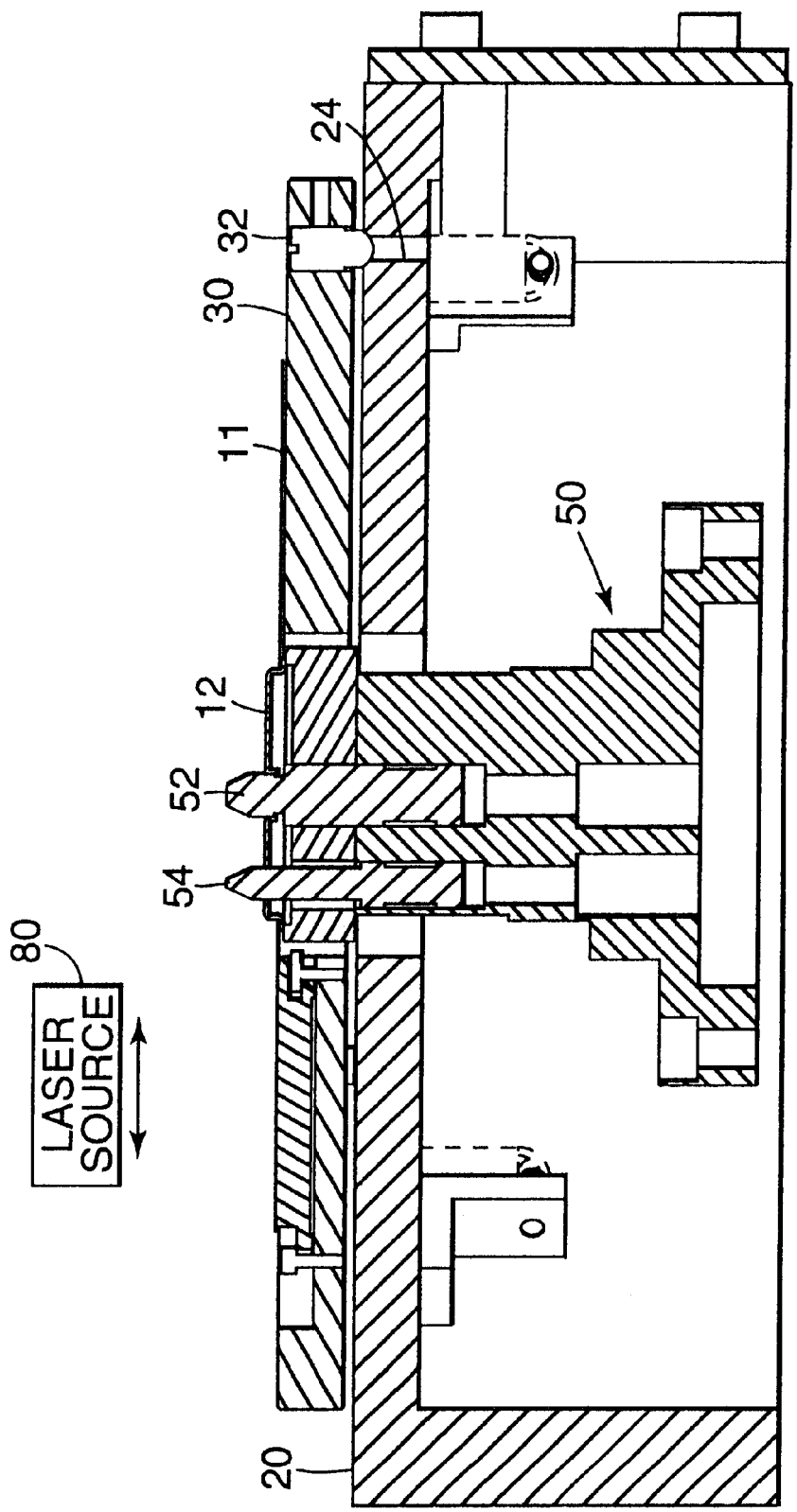
FIG. 4 is a cross-sectional view of a portion of the apparatus of FIG. 2.

FIG. 4 is a cross-sectional view of a portion of the assembly including the base 20, media platform 30, spindle 50, and a disk 10 mounted on the spindle 50. As assembled, it is preferred that the hub platform 56 be located about 0.2 mm below the upper surface of the media platform 30 for use with the preferred disk 10. It will be understood, however, that this dimension can vary based on the actual hub 12 of disk 10 being processed.

The shroud 40 is placed over the upper surface of the base 20 and media platform 30 and includes vacuum holes 42 connected to a vacuum source (not shown) to provide for removal of debris produced during the servowriting process. It is preferred that the vacuum holes 42 are generally located below the upper surface of the media platform 30. Location of the vacuum holes 42 below the media platform 30 can assist in stabilizing the media 11 on the platform 30, as well as improve the stability of the media in the area of the media support 60 (described in more detail below). If vacuum is not desired, the shroud 40 can be omitted from the apparatus.

Figure 5:
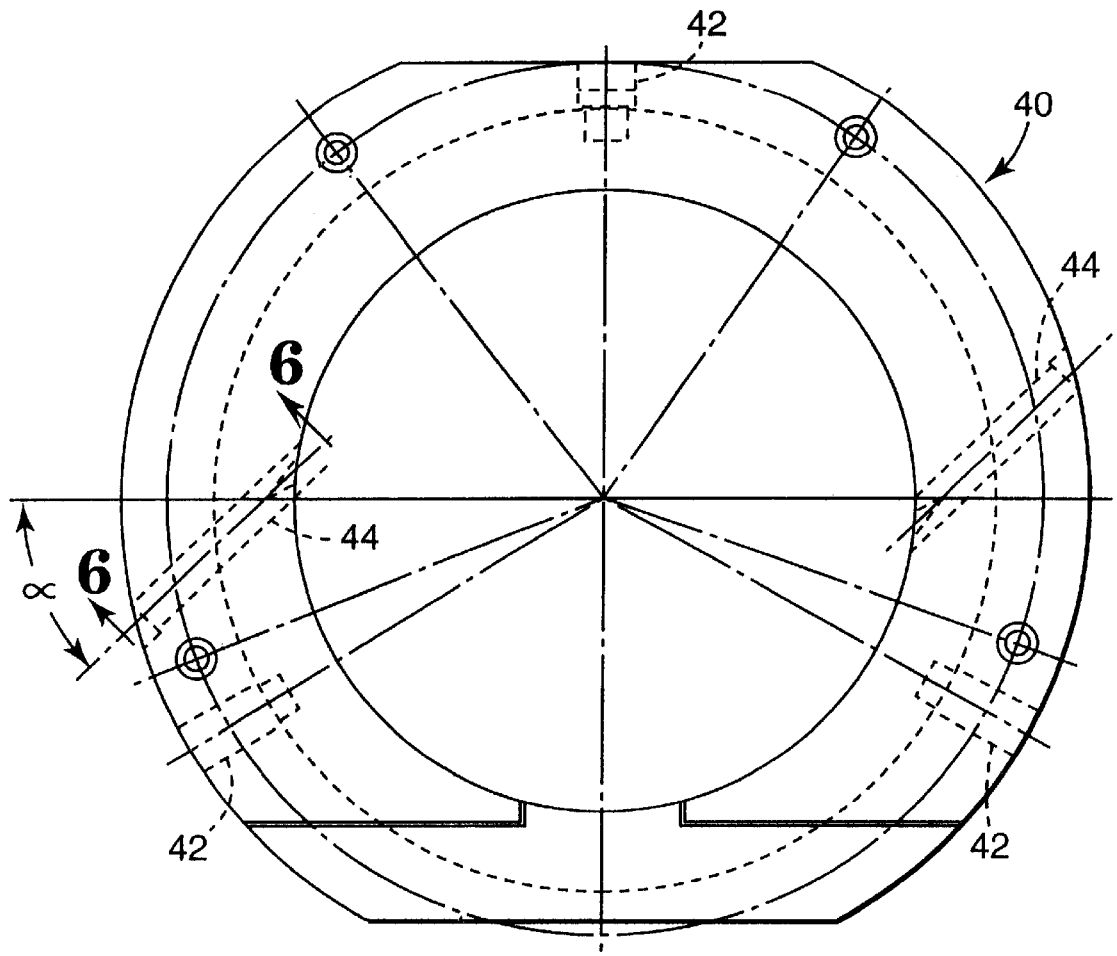
FIG. 5 is a plan view of a shroud used in the apparatus of FIG. 2.

FIG. 5 depicts one preferred shroud 40 that also includes air jet holes 44 attached to a source of pressurized air (or other gas) to align the disk 10 on the spindle 50 as described generally in U.S. Pat. No. 5,322,987 (Thomas et al.). The holes 44 in shroud 40 are preferably at an angle a such that the air blown through the holes 44 strikes the disk 10 tangent to the outside edge of a disk 10 located on the media platform 30. As a result, the angle a can vary based on the size of the disk 10.

Figure 6:
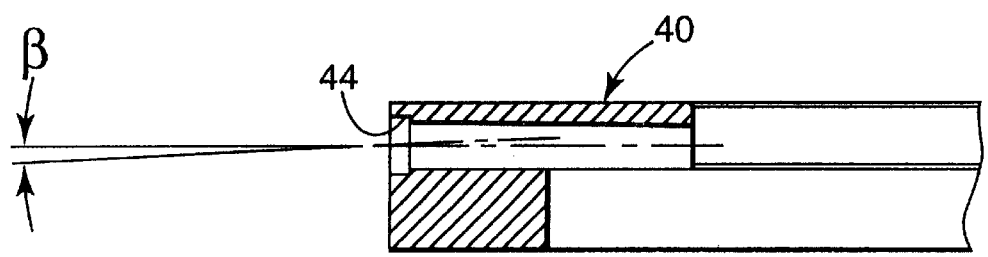
FIG. 6 is an enlarged partial cross-sectional view of the shroud of FIG. 5, taken along line 6—6.

It is also preferred that the hole 44 be angled downward with respect to level such that the hole 44 is directed air down towards the media platform 30. This feature is best seen in FIG. 6, which is a partial cross-section of the shroud 40 taken along line 6—6 in FIG. 5. The angle β along which hole 44 is formed is preferably about three degrees.

Figure 7:
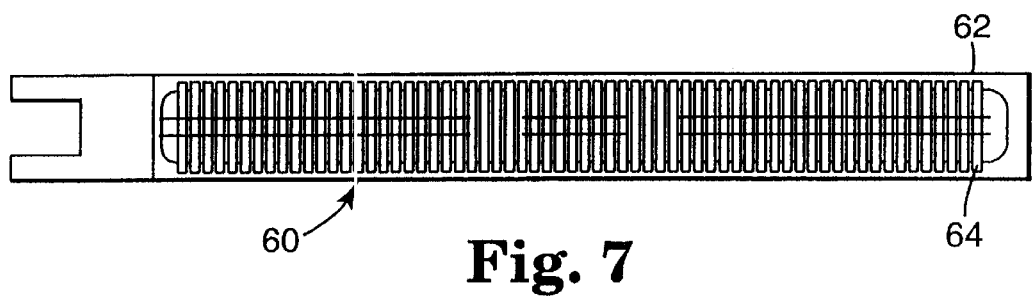
FIG. 7 is a plan view of one media support according to the present invention.
Figure 8:
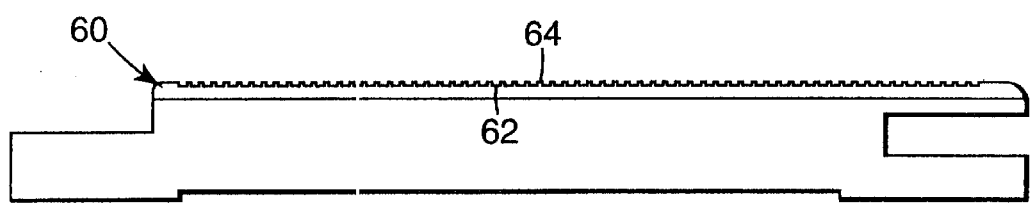
FIG. 8 is a side view of the media support of FIG. 7.
Figure 9:
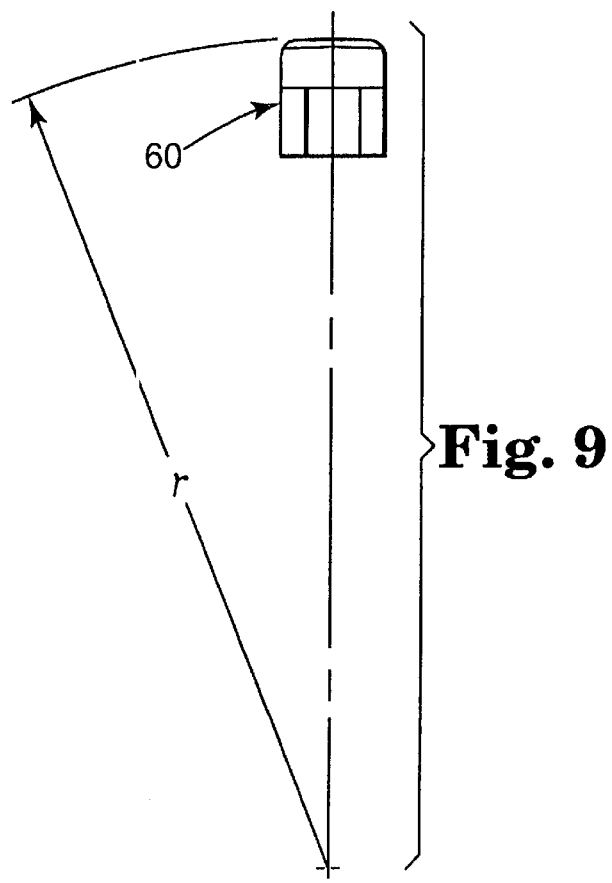
FIG. 9 is an end view of the media support of FIG. 7.

FIG. 7 is a top view of the media support 60, FIG. 8 is a side view of the support 60, and FIG. 9 is an end view of the support 60. Although it may be possible to achieve adequate media stabilization by providing only a slot 38 in the media platform 30, it is typically preferable to provide a media support 60 in slot 38. The media support 60 stabilizes the flexible media 11 on a disk 10 during laser servowriting. To reduce and/or control the formation of an air bearing between the media support 60 and media 11, the support 60 preferably includes a plurality of channels 62 formed in the upper surface 64 of the support 60. The channels 62 provide a path for air traveling with the flexible media 11 as it is rotated above the stationary media platform 30 during servowriting. As a result, the vertical positioning of the flexible media 11 is stabilized, allowing for reliable servowriting of the optical servo track pattern on the surface of the media 11.

The media support 60 can be manufactured from any suitable material or materials. It is preferred that the materials used are wear-resistant and capable of being formed into the desired shape. Examples of suitable materials include silicon carbide or stainless steel, although any ceramic, metal, plastic, etc. could be used if it possesses the desired characteristics. The slots formed at either end of the support 60 are used for retaining the support in position on media platform 30. Any suitable structure for accomplishing the same function could be substituted.

The pattern used in media support 60 includes channels 62 having a width of 0.254 mm, with adjacent channels 62 being separated by a land 64 with a width of 0.127 mm. As a result, the channels 62 are spaced on 0.381 mm centers. The widths of the channels 62 and lands 64 may vary, but preferred ranges for the channel width are from about 0.15 mm to about 0.35 mm, more preferably from about 0.22 mm to about 0.28 mm. Preferred ranges for the land width are from about 0.06 mm to about 0.20 mm, more preferably from about 0.08 mm to about 0.15 mm. The width of the channels 62 relative to the land 64 should, however, typically be chosen to minimize deflection of the media into the channels 62 during rotation. If deflection of the media occurs, the media will not be located at a consistent vertical height along the length of the support 60, leading to variations in the depth and/or width of the servo tracks.

The length of the pattern formed on the preferred support 60 is approximately 24 mm while the width of the support 60 is approximately 3.2 mm, although it will be understood that these values will also vary based on a variety of factors including the size of the disk 10.

FIG. 9 illustrates the radius of curvature, r, of the upper surface of the media support 60. It is preferred that the upper surface of support 60 be provided with some radius of curvature. In designs similar to media support 60, it is preferred that the radius of curvature lie within the range from about 15 mm to about 35 mm, more preferably about 22 mm to about 28 mm, with one specific preferred radius of curvature being approximately 25.4 mm. The exact radius of curvature chosen for a given apparatus is, however, a balance between competing factors. A smaller or tighter radius of curvature may be preferred because it can prevent the formation of an air bearing between the media 11 and the media support 60. Conversely, a larger radius of curvature can provide more room for aligning movement of the laser optics along the crest or top of the support 60, i.e., errors in the movement of the optics and/or the alignment of the support 60 along the radius of the media platform 30 are better tolerated if the support 60 has a larger radius of curvature, which contributes to the ability of the system to provide a uniform distance between the optics and the media.

Another variation that may contribute to the stability of the media 11 passing over media support 60 is the width (measured tangentially) of the slot 38 formed in the media platform 30. In some instances, the slot 38 may be the same width as the support 60, although it may be preferred to provide a slot 38 having a width (measured tangentially) that is greater than the width of the support 60. As a result, the slot 38 forms a pair of channels on either side of the media support 60. The channels formed by slot 38 and media support 60 may prevent the formation of an air bearing between the support 60 and media 11. The support 60 will typically be centered in the slot 38, although it may be beneficial to locate the media support 60 to one side (tangentially) of the slot 38.

Although the exact ratio of the slot width to media support width can vary, it may be preferred that the ratio (slot width:media support width) be about 2.5:1 or less, more preferably about 2:1 or less, and even more preferably about 1.8:1 or less. In one preferred apparatus, the width of the support 60 is about 3.2 mm while the width of the slot 38 is about 5.7 mm.

It will be understood, however, that all of the dimensions of the media support 60 and/or slot 38 in media platform 30 can vary based on a variety of factors including the flexibility and surface roughness of the media being processed, the speed at which the media is rotated, the diameter of the media, etc.

Variations in the height of the crown, i.e., the peak, of the media support 60 relative to the media platform 30 can also affect performance of the system. It is preferred that the crown of the support 60 be located above the upper surface of the media platform 30. One preferred range for the height of the crown of the media support 60 above the platform 30 is about 0.13 mm to about 0.38 mm, more preferably about 0.16 mm to about 0.27 mm. One preferred crown height is about 0.22 mm. It will, however, be understood that the optimal height of the crown of the media support 60 above the media platform 30 will be influenced by a variety of factors including the flexibility of the media being processed, the speed at which the media is rotated, the vacuum pulled through the shroud 40 (if any), etc.

A further variation in location of the support 60 includes tilting the support 60 relative to the media platform 30. For example, the crown height at the inner edge of the media support 60 (i.e., the edge closest to the spindle 50) may be lower (relative to the media platform 30) than the crown height at the outer edge of the media support 60 (i.e., the edge furthest from the spindle 50). In one setup, the inner crown height may be about 0.25 mm and the outer crown height may be about 0.75 mm.

One method of laser servowriting a magnetic media disk comprises placing the hub 12 of the disk 10 on the spindle 50, thereby placing the media 11 above the media platform 30 and aligning the disk 10 by directing compressed air through the airjet holes 44 in the shroud 40. Spindle 50 and disk 10 are rotated at up to about 6000 revolutions per minute, although faster rotation may be possible in some situations. At the same time a vacuum source attached to the vacuum holes 42 in shroud 40 is activated. When the disk 10 is rotating at the desired speed, the laser source 80 (See FIG. 4) is activated and the laser beam is translated radially across the media support 60 to process the surface of the media 11 as desired.

Figure 10:
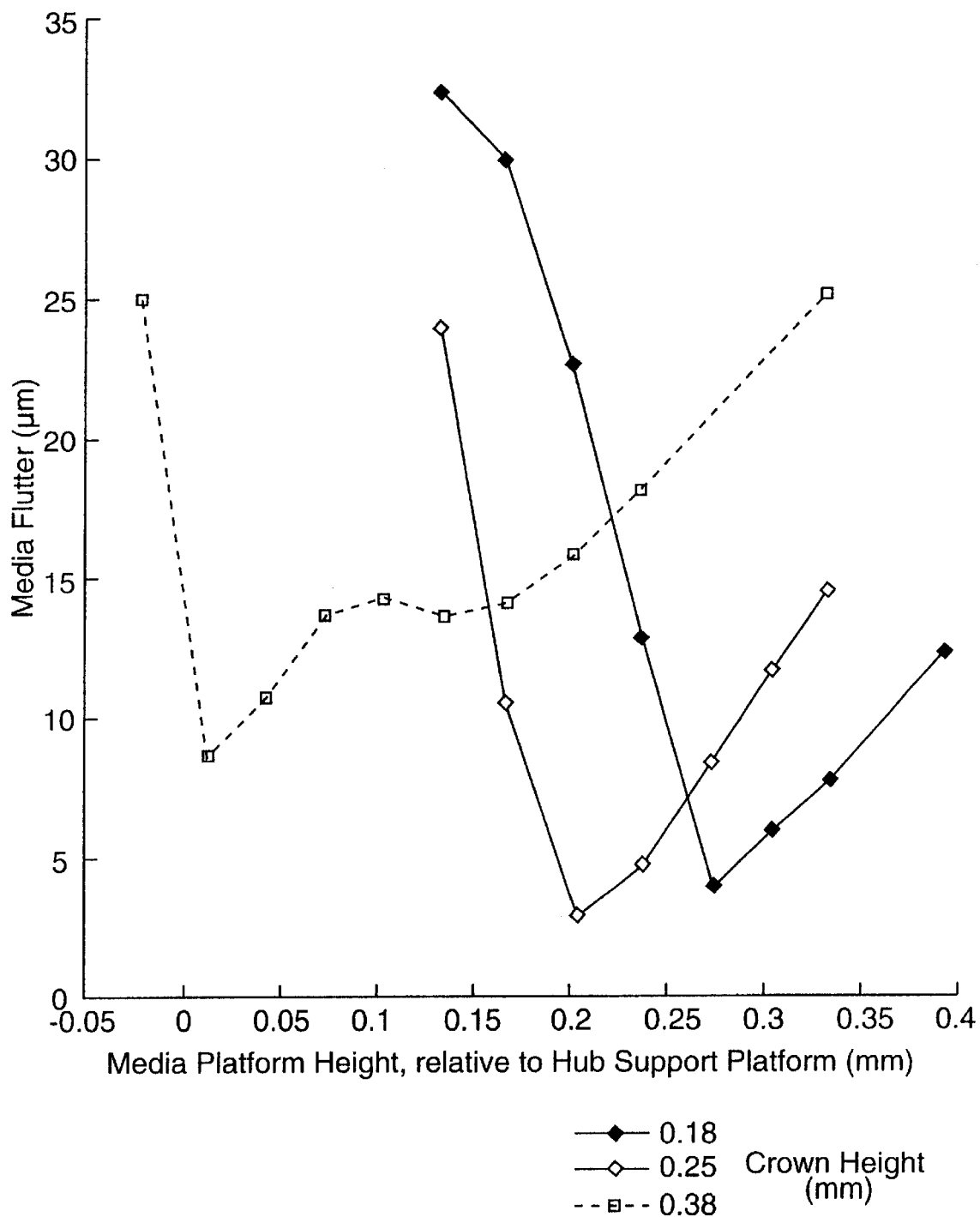
FIG. 10 is a graph of the results of tests performed using a method according to the present invention.

FIG. 10 depicts the results of a number of tests performed using a method according to the present invention. The tests were performed to determine flutter (i.e., variations) in media height in the area of the media support 60 under a variety of combinations in the height of the media platform 30 above the hub support platform 56 of the spindle 50 (x-axis) and the height of the crown of the media support 60 above the media platform 30. The disks used in the tests were formed on a substrate of polyethylene terephthalate film with a nominal thickness of 62 µm, coated on both sides with a magnetic coating and attached to a metallic hub with an adhesive. The disks were processed according to the conditions set forth above.

The flutter (y-axis) was measured at the innermost track on the disk 10, which can be sensitive to flutter (due typically to variations in the bond between the media 11 and hub 12). As used herein, flutter is the vertical distance over which the surface of the media 11 moves during rotation above the media support defined above. As shown, locating the media platform 30 about 0.20 mm above the hub support platform 56 of the spindle 50 appeared to provide the best repeatable results when the crown height of the media support 60 was about 0.25 mm above the media platform 30—resulting in media flutter of about 3 micrometers. These measurements were made using a Keyence Model LC-2400A laser displacement meter.

Although the present invention has been described above in which the media support 60 is generally straight and lies within a straight radial slot 38 formed in the media platform 30, it will be understood that the support 60 and/or slot 38 could follow a curved path within the plane of the media platform 30 from the spindle 50 to the outside diameter of the media platform 30. Alternatively, slot 38 and/or media support 60 could be straight, but located in a different orientation relative to the media platform 30, i.e., not radial. Also, the width of the slot 38 and support 60 have been depicted as constant along their lengths. It may be desirable to vary the widths of the slot 38 and/or support 60 along their lengths to further enhance the stability of media being processed.

In another variation, the media platform 30 and media support 60 may be formed as a one-piece integral member. It is, however, typically preferable to supply the two as separate components to allow for replacement of the media support 60 which may experience some wear after use. In addition, manufacturing of the two as separate components may be less expensive than manufacturing them as a one-piece integral unit.

In still another variation, vacuum may be pulled from a number of locations in addition to or in place of pulling a vacuum through holes 42 in the shroud 40 to enhance the vertical stability of the media in the area above the media support 30. For example, it may be helpful to pull a vacuum from underneath the media platform 30 such that air is pulled through the interface between the spindle 50 and media platform 30. Locating a vacuum in that area may also contribute to lower air pressures in the slot 38 formed in the media platform, which can also contribute to media stability. In another variation, it may be helpful to pull a vacuum through the slot 38 itself, and, further, it may also be helpful to seal the end of the slot 38 adjacent to the spindle 50 and/or the end near the outside diameter of the media platform 30 to isolate the vacuum around the media support 60. All of these locations for vacuum ports, including holes 42 in the shroud 40, can be combined in any manner to provide for optimization of the process. The levels of vacuum pulled from each location must typically be empirically determined based on a number of variable factors including rotational speed of the media, ambient air pressure, size of the features in the apparatus, etc.

Figure 11:
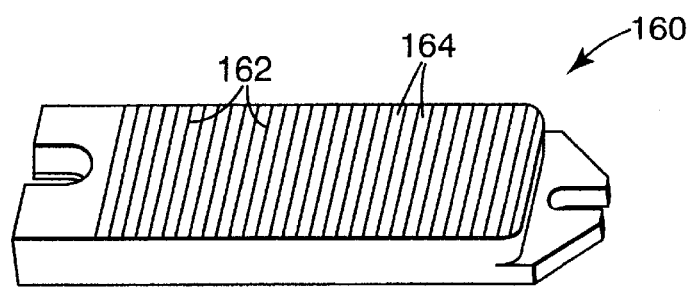
FIG. 11 is a top perspective view of an alternate media support according to the present invention.
Figure 12:
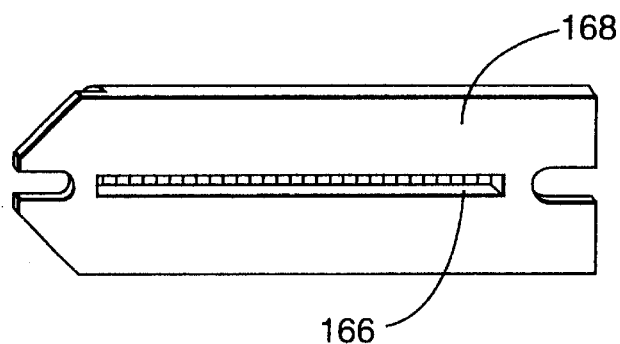
FIG. 12 is a bottom perspective view of the media support of FIG. 11.
Figure 13:
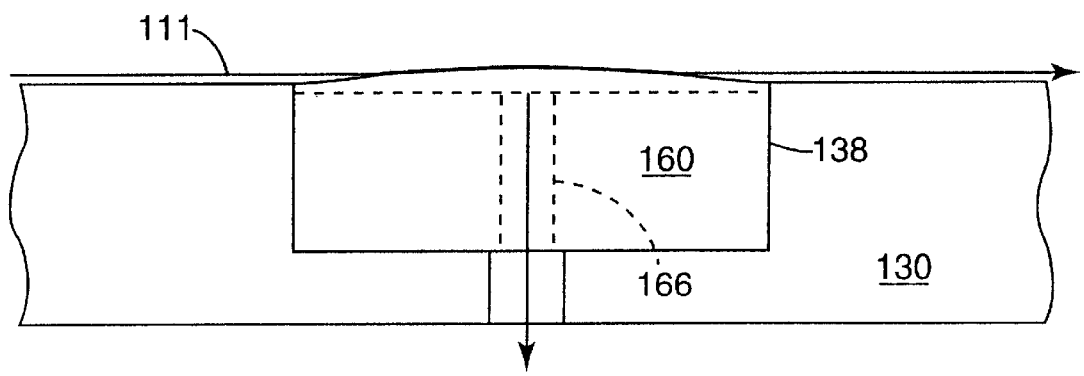
FIG. 13 is a schematic diagram of the media support of FIG. 11 in a platter.

FIGS. 11–13 depict an alternate preferred embodiment of a media support 160 and method of using the media support. The pattern in the media support 160 includes channels 162, with adjacent channels 162 being separated by a land 164. It is preferred, but not required, that the channels 162 have uniform widths and depths. Likewise, it is preferred, but not required, that the lands 164 separating the channels 162 also have a uniform width and height. It will be understood, however, that the width of the channels 162 and/or the lands 164 can vary if so desired.

One significant difference between media support 60 and media support 160 is that the latter is designed to include a vacuum slot 166 located in the bottom surface 168 of the media support 160 (best seen in FIGS. 12 and 13). The vacuum slot 166 opens into at least some of the channels 162. More preferably, the vacuum slot 166 opens into most of the channels 162, and even more preferably the vacuum slot 166 opens into all of the channels 162. The width of the vacuum slot 166 (measured tangentially) can vary based on a variety of factors such as the size of the media support 160, widths of the channels 162 and lands 164, rotational speed of the media, flexibility of the media, etc. Although the depicted vacuum slot 166 is shown with a constant width, it will be understood that the width of the slot 166 can vary along the length of the support 160. Another potential variation is in the size of the apertures through which air is drawn into the vacuum slot 166 from the channels 162. Furthermore, although a vacuum is pulled through the channels in the illustrative media support 160, it could alternatively be pulled through other structures or apertures formed by or within a media support located in a fixed media platform.

During operation of the system, a vacuum is then pulled through the vacuum slot 166 to reduce or eliminate the formation of an air bearing between the media 111 and the support 160 (best seen in FIG. 13). The level of vacuum drawn through the slot 166 will vary based on a variety of factors such as the width (measured tangentially) of the vacuum slot 166, the radial length of the support 160, radial widths of the channels 162 and lands 164 in the support 160, radius of curvature of the support 160, crown height of the media support 160 above the platform 130, rotational speed of the media, flexibility of the media, radial width of the media, whether a vacuum is pulled through the shroud 40, etc.

To at least partially illustrate the processing ranges in which at least some media stabilization can be obtained, the following vacuum levels were drawn through a vacuum slot 166 having a tangential width of about 1.0 mm in a media support 160 having a radial pattern of channels 162 and lands 164 of about 23 mm when processing media 111 with a polyethylene terephthalate film substrate with a nominal thickness of 62 µm. The media 111 had a radial width of about 43 mm and was rotated at about 9000 revolutions per minute. For a support 160 having channel widths of 0.15 millimeter separated by 0.15 millimeter lands, a vacuum of 90 Torr (48 inches of water) was drawn. For a support 160 having 0.15 millimeter channels separated by 0.38 millimeter lands, a vacuum of 26 Torr (14 inches of water) was drawn. For a support 160 having 0.15 millimeter channels separated by 0.56 millimeter lands, a vacuum of 13 Torr (7 inches of water) was drawn. Under all of the conditions set forth above, tests indicated that the media was stabilized above the media support 160.

Another consideration in the design of the media support 160 and the level of vacuum pulled through the vacuum slot 166 is that the media 111 preferably is drawn into contact with at least a portion of the media support 160 as generally depicted in FIG. 13. It is, however, preferred that the media 111 not be drawn so tightly against the media support 160 that the channels 162 and communicating vacuum slot 166 are substantially sealed by the media 111. If the channels 162 and vacuum slot are substantially sealed by the media 111, control over the process is diminished because further variations in the vacuum drawn through the media support 160 will no longer attenuate the force or position of the media 111 above the media support 160. Limiting the contact area between the media 111 and the media support 160 such that the channels 162 and vacuum slot 166 are not substantially sealed off, however, allows for some control over the force provided on the media 111 by the vacuum drawn through the slot 166 and channels 162.

The widths of the channels 162 and lands 164 (measured in the radial direction from the spindle) in the media support 160 may vary based on factors such as the flexibility of the media, rotational speeds, radial length of the media, vacuum drawn through the support 160, etc. One consideration, however, is that the width of the channels 162 and the lands 164 are preferably chosen to minimize deflection of the media into the channels 162 during rotation. If deflection of the media occurs, the media will not be located at a consistent vertical height along the length of the support 160, leading to variations in the depth and/or width of the servo tracks.

In some illustrative embodiments, the channels 162 can have a width of about 0.1 millimeter or greater and the lands 164 can have a width of about 0.1 millimeter or greater. In other embodiments, it may be helpful to provide lands 164 with a width of about 0.3 millimeter or greater. In still other embodiments, it may be helpful to provide lands 164 with a width of about 0.5 millimeter or greater. Generally, it may be helpful to provide lands 164 that have a width that is greater than or about equal to the width of the channels 162 they separate. As expressed in terms of ratios, it may be helpful if the ratio of the width of the lands 164 to the width of the channels 162 is about 1:1 or more, possibly as large as about 2:1 or more, and, in some instances about 3:1 or more.

Some illustrative combinations of channel 162 and land 164 widths for processing a polyethylene terephthalate film substrate with a nominal thickness of 62 $\mu$m are 0.15 millimeter channels 162 separated by 0.15 millimeter lands 164, 0.15 millimeter channels 162 separated by 0.38 millimeter lands 164, and 0.15 millimeter channels 162 separated by 0.56 millimeter lands 164.

The radial length of the pattern formed by the channels 162 and lands 164 on the preferred support 160 is approximately 24 mm. That value is, of course, largely dependent on the radial dimensions of the media 11 being processed.

As with media support 60 described above, it is preferred that the upper surface of the media support 160 also be provided with some radius of curvature (illustrated schematically in FIG. 13). Preferably, the radius of curvature of media supports similar to the design of media support 160 will lie within the range from about 70 mm to about 120 mm, more preferably about 85 mm to about 110 mm, with one specific preferred radius of curvature being approximately 97 mm. The exact radius of curvature chosen is a balance between competing factors. A smaller or tighter radius of curvature may help to prevent formation of an air bearing between the media 111 and the media support 160. Conversely, a larger radius of curvature can provide more room for aligning movement of the laser optics along the crest or top of the support 160, i.e., errors in the movement of the optics and/or the alignment of the support 160 along the radius of the media platform 130 are better tolerated if the support 160 has a larger radius of curvature, which contributes to the ability of the system to provide a uniform distance between the optics and the media. In addition, a larger radius of curvature can reduce distortion of the media 111 above media supports 160 through which a vacuum is drawn.

Another variation that may contribute to the stability of the media 111 passing over media support 160 is the width (measured tangentially) of the slot 138 formed in the media platform 130. When using media support 160, it may be helpful to provide a slot 138 in the media platform 130 that is the same width as the support 160, although placing the media support 160 in a wider slot as discussed above in connection with media support 60 and slot 38 is also envisioned for media supports similar in design to media support 160. In one preferred apparatus, the width of the slot 138 and the width of the corresponding media support 160 is about 9.5 millimeters.

Variations in the height of the crown, i.e., the peak, of the media support 160 relative to the media platform 130 can also affect performance of the system. It is generally preferred that the crown of the support 160 be located above the upper surface of the media platform 130. The height of the crown above the media platform 130 can vary, although it may generally be preferred that the height of the crown substantially match the natural height of the media 111 above the media platform 130 during rotation of the media 111 at processing speeds. In one illustrative embodiment, the height of the crown of the media support 160 above the platform 130 is about 0.15 mm. It will, however, be understood that the optimal height of the crown of the media support 160 above the media platform 130 will be influenced by a variety of factors including the flexibility of the media being processed, the speed at which the media is rotated, the vacuum pulled through the shroud 40 (if any), vacuum pulled through the media support, etc.

A further variation in location of the support 160 includes tilting the support 160 relative to the media platform 130. For example, the crown height at the inner edge of the media support 160 (i.e., the edge closest to the spindle) may be lower (relative to the media platform 130) than the crown height at the outer edge of the media support 160 (i.e., the edge furthest from the spindle).

Figure 14:
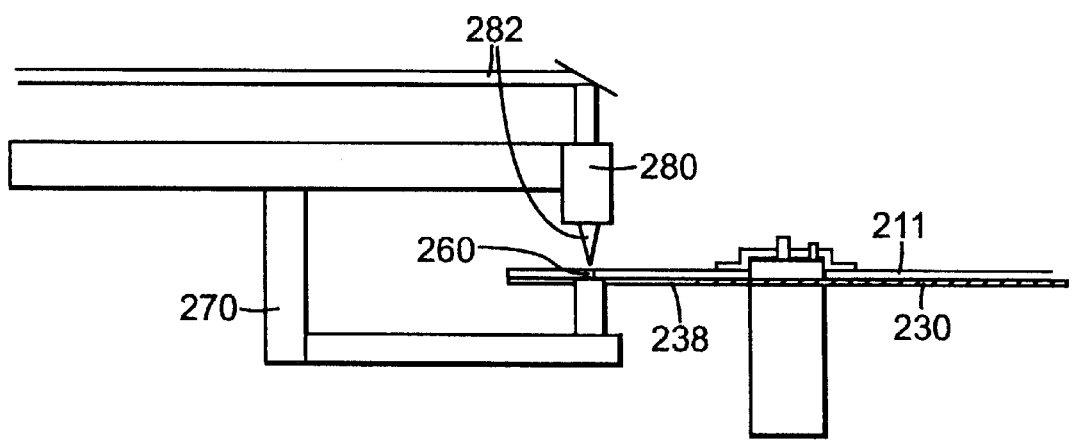
FIG. 14 is a schematic diagram of an alternate laser servowriting apparatus manufactured according to the present invention.

Although the embodiments of the present invention described above have included a fixed media support in a fixed media platform (where the position of the media support is fixed relative to the media platform), another variation in the present invention can include a movable media support as depicted schematically in FIG. 14. The media support 260 is fixed with respect to the laser optics 280 (which deliver the laser energy 282 needed for servowriting) by some structure 270 which is movable with respect to the media platform 230. A slot 238 is provided in the fixed media platform 230 and it is through that slot 238 that the media support 260 moves as the laser optics 280 are moved radially to provide servo tracks on the media 211. The movable media support 260 will typically be shorter than the fixed media supports 60 and 160 described above because the media need only be supported in the general area in which the servowriting is being performed. All other variations in the media supports 60 and 160 described above can also apply to a movable media support 260, including the channels, lands, radius of curvature, location of the crown relative to the media platform, addition of vacuum during processing, etc.

Various modifications and alterations of this invention will become apparent to those skilled in the art without departing from the scope of this invention, and it should be understood that this invention is not to be unduly limited to the illustrative embodiments set forth herein.

What is claimed is:

1. A method of stabilizing data storage media during laser servowriting of optical servo tracks on the media, the method comprising:

placing the media on a spindle having an axis of rotation, wherein the media has a top surface and a bottom surface;

stabilizing the vertical position of the media by rotating the media about the axis of rotation above a stationary media platform defining a plane and a stationary media support located within a slot in the media platform, the media support comprising a plurality of channels aligned generally tangential to the axis of rotation of the spindle, wherein the bottom surface of the media contacts with the media support wherein the media support is fixed to the media platform during laser servowriting; and laser servowriting optical servo tracks on the media.

2. The method of claim 1, wherein the media support further comprises a vacuum slot opening into at least one channel of the plurality of channels, and wherein the method further comprises drawing a vacuum through the vacuum slot while rotating the media.

3. The method of claim 1, wherein the media support further comprises a vacuum slot opening into at least one channel of the plurality of channels, and wherein the method further comprises drawing a vacuum through the vacuum slot while rotating the media, and further wherein the media does not substantially seal the channels and the vacuum slot while rotating.

4. The method of claim 1, wherein the media support comprises an upper surface having a crown, the crown being located at a crown height above the media platform.

5. The method of claim 1, wherein the media support comprises an upper surface having a crown, the crown being located at a crown height above the media platform, and further wherein the crown height substantially matches the natural height of the media above the media platform during rotation of the media at processing speeds.

6. A method of stabilizing data storage media during laser servowriting of optical servo tracks on the media, the method comprising:

placing the media on a spindle having an axis of rotation, wherein the media has a top surface and a bottom surface;

providing a stabilizing apparatus consisting essentially of structures located below the bottom surface of the media, wherein the stabilizing apparatus comprises a stationary media platform defining a plane and a stationary media support located within a slot in the media platform, the media support comprising a plurality of channels aligned generally tangential to the axis of rotation of the spindle;

rotating the media above the media platform and the media support about the axis of rotation wherein the media support is fixed relative to the media platform during laser servowriting; and laser servowriting optical servo tracks on the media.

7. The method of claim 6, wherein the bottom surface of the media contacts the media support when the media is rotating above the stabilizing apparatus.

8. The method of claim 6, wherein the media support further comprises a vacuum slot opening into at least one channel of the plurality of channels, and wherein the method further comprises drawing a vacuum through the vacuum slot while rotating the media.

9. The method of claim 8, wherein the media does not substantially seal the channels and the vacuum slot while rotating.

10. The method of claim 6, wherein the media support comprises an upper surface having a crown, the crown being located at a crown height above the media platform.

11. The method of claim 6, wherein the media support comprises an upper surface having a crown, the crown being located at a crown height above the media platform and further wherein the crown height substantially matches the natural height of the media above the media platform during rotation of the media at processing speeds.

12. A system for stabilizing data storage media during laser servowriting of optical servo tracks on the media, the system comprising:

a spindle for rotating the media during servowriting, the spindle having an axis of rotation about which the media rotates during servowriting;

a laser for servowriting optical servo tracks on the media; and stabilizing apparatus consisting essentially of:
a stationary media platform located about the spindle, the media platform defining a plane;
a stationary media support located within a slot in the media platform and comprising a plurality of channels aligned generally tangential to the axis of rotation of the spindle, wherein the media support is fixed relative to the media platform.

13. A system according to claim 12, wherein the media support further comprises a vacuum slot opening into at least one channel of the plurality of channels.

14. A system according to claim 12, wherein the width of the slot, measured tangentially relative to the axis of rotation, is greater than the width of the media support as measured tangentially relative to the axis of rotation.

15. A system according to claim 12, wherein the media support extends radially away from the spindle.

16. A system according to claim 12, wherein the media support comprises an upper surface having a crown, the crown being located at a crown height above the media platform.

17. A system according to claim 16, wherein the crown height substantially matches the natural height of the media above the media platform during rotation of the media at processing speeds.

18. A system according to claim 16, wherein the crown height of the media support varies relative to the media platform.

19. A system according to claim 18, wherein the crown height nearest the spindle is lower than the crown height furthest from the spindle.

20. A system according to claim 12, wherein the ratio of the width of a land between a pair of adjacent channels to the width of said adjacent channels is about 1:1 or more.

* * * * *